US011141753B2

(12) United States Patent
Sousa et al.

(10) Patent No.: US 11,141,753 B2
(45) Date of Patent: Oct. 12, 2021

(54) COATING SYSTEM

(71) Applicant: UNIVERSITY OF CAPE TOWN, Cape Town (ZA)

(72) Inventors: Duarte Rui Sousa, Surrey (CA); Nabeel Hussain, Rosebank (ZA)

(73) Assignee: UNIVERSITY OF CAPE TOWN, Cape Town (ZA)

(*) Notice: Subject to any disclaimer, the term of this patent is extended or adjusted under 35 U.S.C. 154(b) by 91 days.

(21) Appl. No.: 16/343,359

(22) PCT Filed: Oct. 18, 2017

(86) PCT No.: PCT/IB2017/056469
§ 371 (c)(1),
(2) Date: Apr. 18, 2019

(87) PCT Pub. No.: WO2018/073758
PCT Pub. Date: Apr. 26, 2018

(65) Prior Publication Data
US 2019/0240692 A1 Aug. 8, 2019

(30) Foreign Application Priority Data
Oct. 19, 2016 (GB) ........................... 1617697

(51) Int. Cl.
*B05B 13/02* (2006.01)
*B05B 12/08* (2006.01)
(Continued)

(52) U.S. Cl.
CPC ............ *B05B 13/0221* (2013.01); *B05B 1/24* (2013.01); *B05B 7/201* (2013.01); *B05B 9/002* (2013.01); *B05B 12/084* (2013.01); *B05B 17/06* (2013.01); *B05C 5/001* (2013.01); *B05C 5/0245* (2013.01); *B05C 5/0295* (2013.01); *B65G 15/00* (2013.01);
(Continued)

(58) Field of Classification Search
None
See application file for complete search history.

(56) References Cited

U.S. PATENT DOCUMENTS 2,644,717 A 7/1953 Kopperschmidt
5,176,874 A 1/1993 Mourer et al.
(Continued)

FOREIGN PATENT DOCUMENTS

DE 102005039169 A1 3/2007
DE 102005043222 A1 3/2007
(Continued)

OTHER PUBLICATIONS

European Patent Office—International Search Report of the International Searching Authority for International Application No. PCT/IB2017/056469 dated Feb. 8, 2017, 5 pgs.
(Continued)

*Primary Examiner* — Jethro M. Pence
(74) *Attorney, Agent, or Firm* — Womble Bond Dickinson (US) LLP

(57) ABSTRACT

A coating system (1) is provided which includes an ultrasonic sprayer (3) capable of spraying a coating fluid onto a target surface (5). A convective or infrared heater (21) is associated with the sprayer and is operable to heat the spray (23) produced by the sprayer (3).

11 Claims, 1 Drawing Sheet

Figure 1:
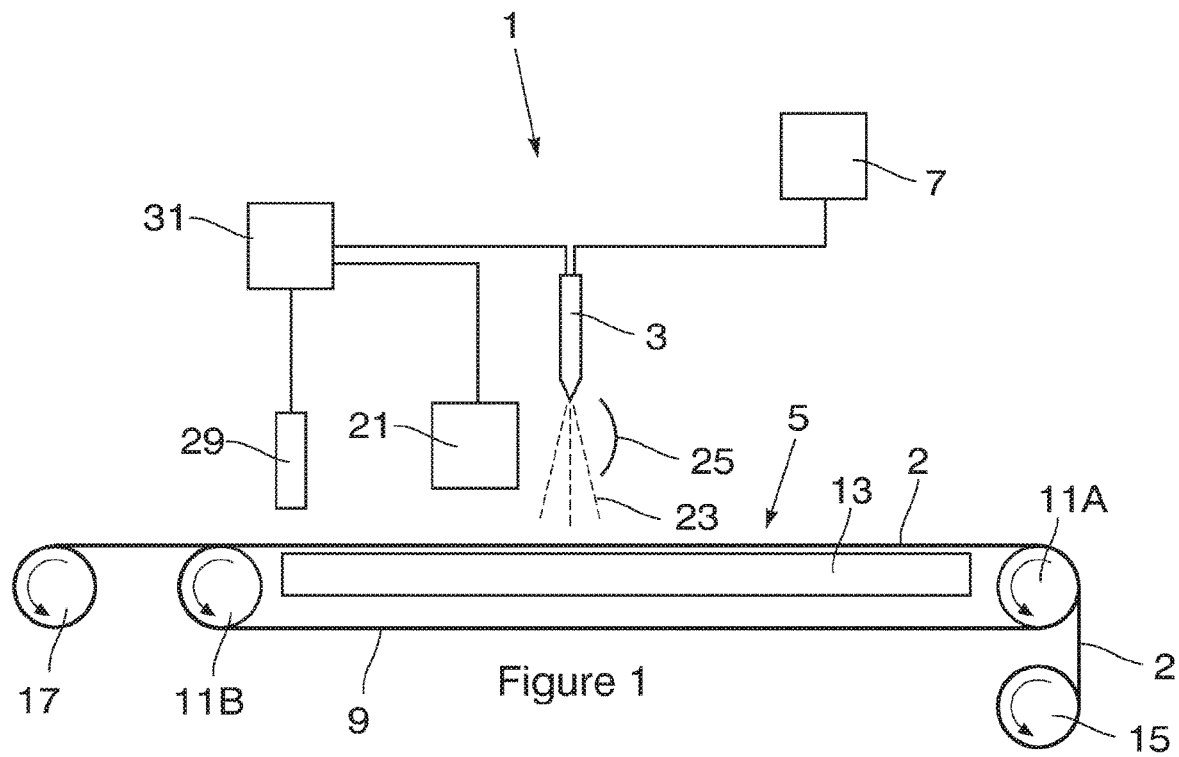

(51) Int. Cl.
*B05B 17/06* (2006.01)
*B65G 15/00* (2006.01)
*H01M 4/88* (2006.01)
*H01M 8/0228* (2016.01)
*H01M 8/1004* (2016.01)
*B05B 1/24* (2006.01)
*B05B 9/00* (2006.01)
*B05B 7/20* (2006.01)
*B05C 5/00* (2006.01)
*B05C 5/02* (2006.01)
*H01M 8/1018* (2016.01)

(52) U.S. Cl.
CPC ......... *H01M 4/881* (2013.01); *H01M 8/0228* (2013.01); *H01M 8/1004* (2013.01); *H01M 2008/1095* (2013.01); *Y02E 60/50* (2013.01)

(56) References Cited

U.S. PATENT DOCUMENTS

| | | | |
|---|---|---|---|
| 5,609,687 A * | 3/1997 | Neff | B05B 7/228 |
| | | | 118/620 |
| 2,776,254 A | 7/1998 | Yuuki et al. | |
| 8,021,715 B2 * | 9/2011 | Jensen | H05K 3/102 |
| | | | 427/189 |
| 2002/0033134 A1 * | 3/2002 | Fannon | F26B 3/28 |
| | | | 118/667 |
| 2004/0126481 A1 | 7/2004 | Weber | |
| 2005/0139156 A1 | 6/2005 | Ahn et al. | |
| 2009/0032612 A1 | 2/2009 | Kunstmann et al. | |
| 2013/0164452 A1 * | 6/2013 | Rajala | C03C 17/002 |
| | | | 427/472 |
| 2013/0251911 A1 | 9/2013 | Schrof et al. | |
| 2016/0068954 A1 | 3/2016 | Srinivasan et al. | |

FOREIGN PATENT DOCUMENTS

| | | |
|---|---|---|
| EP | 1743707 A1 | 1/2007 |
| WO | 03/047764 A1 | 6/2003 |
| WO | 2009/041774 A2 | 4/2009 |

OTHER PUBLICATIONS

European Patent Office—Written Opinion of the International Searching Authority for International Application No. PCT/IB2017/056469 dated Feb. 8, 2017, 7 pgs.

Examination Report of the European Patent Convention for European Patent Application No. 17800611.0, dated Apr. 16, 2021, pp. 5.

* cited by examiner

COATING SYSTEM

CROSS-REFERENCE TO RELATED APPLICATIONS

This patent application is a U.S. National Phase application under 35 U.S.C. § 371 of International Application No. PCT/IB2017/056469, filed Oct. 18, 2017, entitled "A COATING SYSTEM", which claims the priority to GB Application Number 1617697.6 filed Oct. 19, 2016, entitled "A COATING SYSTEM", the entire contents of which are hereby incorporated herein by reference.

FIELD OF THE INVENTION

This invention relates to a system for spray coating a surface.

BACKGROUND TO THE INVENTION

Spray coating can be an effective method of coating a surface with a coating fluid. This process uses a sprayer to reduce a liquid to a fine spray which could take the form of small droplets or a mist. A very common method of producing a spray is forcing a liquid through a suitable nozzle under pressure. This process could be facilitated or accompanied by the use of a carrier gas such as air. More recently ultrasonic sprayers (often referred to as ultrasonic nozzles) have been developed which produce a spray through ultrasonic excitation of a fluid. Some of these make use of nozzles while others do not require a nozzle.

A problem experienced with spray coating is that the properties required of the coating fluid to be capable of being sprayed are not necessarily the ideal properties required for coating a surface. For example, fuel cells make use of a catalyst coated membrane (CCM) as part of a laminated plate structure. The catalyst is typically a platinum catalyst which is supplied as a suspension and often referred to as an ink. The suspension is typically applied to a transfer medium, allowed to dry and then applied to the membrane. A further method is to spray the ink directly onto the membrane using an ultrasonic sprayer. To be suitable for use in an ultrasonic sprayer the ink has to have a relatively low viscosity and solids content, however, it should ideally be applied to the membrane as a fluid with a relatively high viscosity and high solids content to reduce potential deformation of the membrane which is typically sensitive to wetting. As a result, the coating process is performed under sub-optimal conditions which can result in deformation of the membrane. This problem can potentially be overcome by increasing the distance between the sprayer and the membrane and by heating the membrane to cause drying of the droplets.

However, this requires the sprayer height to be adjusted for each ink used and can also result in less accurate coating and hence wastage of the ink. It is also not very effective at drying the spray droplets. Heating the membrane during spraying is undesirable as it may reduce the uniformity of the coating.

In this specification "sprayer" and "spray" shall have their widest meaning and include any device for atomising or producing fine droplets from a fluid, and the atomised fluid, fine droplets or mist so produced.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a coating system which includes a sprayer capable of spraying a coating fluid onto a target surface and mounted spaced apart from a bed on which a target surface is operatively located, characterised in that an electromagnetic radiation emitting device configured to produce a beam of electromagnetic radiation is located adjacent the sprayer and is directed towards spray produced by the sprayer in use so as to be operable to alter a physical characteristic of the spray, wherein the physical characteristic is selected from viscosity, solids content, density and composition.

Further features of the invention provide for the sprayer to be an ultrasonic sprayer; for the electromagnetic radiation emitting device to be a source of electromagnetic radiation selected from infrared, ultraviolet and microwave radiation.

Still further features provide for the beam of electromagnetic radiation to be focused on the spray, and for the beam to be shaped or sized to approximate a spray path defined by the spray.

Even further features of the invention provide for the system to include at least one sensor to measure a characteristic of the spray or coating on the target surface; for each sensor to be connected to a controller; and for the controller to control operation of either or both of the sprayer and the electromagnetic radiation emitting device in consequence of the measurements from each sensor.

According to one embodiment of the invention the coating system includes an ultrasonic sprayer capable of spraying a coating fluid onto a target surface and mounted spaced apart from a bed on which a target surface is operatively located, and is characterised in that a convective or infrared heater is located adjacent the sprayer and is directed towards spray produced by the sprayer in use so as to be operable to heat the spray.

Further features according to this embodiment provide for the bed to be a conveyor assembly, preferably a vacuum conveyor.

An embodiment of the invention will now be described, by way of example only, with reference to the accompanying drawings.

BRIEF DESCRIPTION OF THE DRAWINGS

In the drawings:

FIG. 1 is schematic side elevation of a first embodiment of a coating system; and FIG. 2 is schematic side elevation of a second embodiment of a coating system.

DETAILED DESCRIPTION WITH REFERENCE TO THE DRAWINGS

A coating system is provided which includes a sprayer capable of spraying a coating fluid onto a target surface. The sprayer could be an ultrasonic sprayer or any other suitable sprayer for the coating fluid. The sprayer is mounted spaced apart from a bed on which a target surface is operatively located and secured in a desirable orientation relative to the bed. Typically, the sprayer will be oriented to spray perpendicularly onto the bed, but any suitable orientation could be used and the sprayer's orientation could also be selectively movable.

The bed could be provided by any suitable support for a target surface. Where the target surface is planar, such as a sheet-like membrane, the bed could be provided by a complementary stationary, table-like surface or a moving surface such as a conveyor assembly which may include a driven belt or the like. Suitable securing means could be provided on the bed to secure the target surface in place, such as by way of a vacuum, magnetism or mechanical fasteners.

The coating system further includes an electromagnetic radiation emitting device, which could also be termed a spray modifying device, which is associated with the sprayer and which is operable to alter a physical characteristic of the spray produced by the sprayer. The electromagnetic radiation emitting device or spray modifying device will be external to and associated with the sprayer in such a way that it acts on at least part of the spray being produced. The electromagnetic radiation emitting device produces a form of electromagnetic radiation and is associated with the sprayer in such a way as to direct the electromagnetic radiation towards spray produced by the sprayer in use so as to be operable to alter a physical characteristic of the spray. The electromagnetic radiation emitting device can conveniently be located between the sprayer and the bed, out of the path of the spray, or adjacent the sprayer and oriented in the direction of the spray. The electromagnetic radiation emitting device could act within a tunnel, tube or conduit through which the spray passes. Any suitable location for the spray modifying device can, however, be used.

The electromagnetic radiation emitting device can be a source of convective heat or electromagnetic radiation, including, but not limited to infrared, ultraviolet and microwave radiation. The beam of electromagnetic radiation produced will preferably be shaped to extend across the width or diameter of the spray and be of sufficient strength to penetrate through the spray. The beam can be focused on the spray and shaped or sized to approximate a spray path defined by the spray. The beam may be selected or configured to only act on the spray and to have a limited effect, preferably no effect, on the environment or the spray from other sprayers which may be adjacent to the sprayer in question. Suitable reflectors may be used to focus and contain the beam. Reflectors can also be configured to direct radiation which penetrates the spray back through the spray towards the source of electromagnetic radiation. The reflectors may be secured facing the source of electromagnetic radiation.

The electromagnetic radiation emitting device provides an advantage over known methods of reducing the solvent content of spray. Some known methods involve increasing the distance between the sprayer and the target surface and heating the underside of the target surface to promote evaporation of solvent. However, increasing the distance between the sprayer and target surface results in overspray, which wastes the expensive catalyst ink and adds to the costs of production. By incorporating a spray modifying device as herein described, the spray nozzles may be fixed in position close to the target surface to reduce overspray, and the solvent content of the spray may be adjusted as required by modulating the heat or radiation emitted by the device. Furthermore, the electromagnetic radiation emitting device may apply heat or radiation above the target surface and not to the target surface, which has the advantage of protecting the sprayed surface from heat or radiation damage.

The physical characteristics of the spray which can be modified include, but are not limited to, its viscosity, solids content, density and composition. For example, the viscosity, solids content, or density of a spray can be increased by causing evaporation of solvents or carriers, such as through heating with convection, infrared or microwave radiation. Chemical reactions could also be initiated within spray droplets, for example a polymerisation reaction initiated through exposure to ultraviolet radiation.

Any suitable coating fluid could be used, including, solutions, dispersions, suspensions and powders and these may take the form of paints, inks, slurries, lacquers and the like.

The system may further include one or more in-line sensors to measure a characteristic of the spray or coating on the target surface. For example, where an ink containing a platinum catalyst is coated onto a membrane, non-destructive Bendtsen permeance gauges or sensors can be used to determine the in-plane permeability or roughness of the coating on the membrane. The measurements from these can be fed into a controller and used to control operation of either or both of the sprayer and the electromagnetic radiation emitting device in consequence of the measurements from the or each sensor.

The system may include multiple sprayers with an electromagnetic radiation emitting device for each sprayer or a single electromagnetic radiation emitting device associated with a number of sprayers. Similarly, more than one electromagnetic radiation emitting device can be associated with each sprayer and each electromagnetic radiation emitting device may modify a different characteristic of the spray. Where multiple electromagnetic radiation emitting devices are used for each sprayer they can be arranged to act simultaneously or sequentially on the spray. For example, a first electromagnetic radiation emitting device could be positioned to cause a reaction to take place in the spray with a second electromagnetic radiation emitting device positioned to cause evaporation of a solvent after the reaction has occurred.

One embodiment of a spray coating system (1) for coating a membrane (2) with a platinum catalyst ink is shown in FIG. 1 and includes a sprayer (3) which is secured above a horizontally extending bed (5) to spray downwardly in the direction of the bed (5). In this embodiment the sprayer (3) is an ultrasonic sprayer which is fed from a reservoir (7) filled with the platinum catalyst ink coating fluid. The ink is delivered from the reservoir (7) to the spray nozzle(s) via a pulse-less ink delivery system such as dual-acting syringe pumps, a diaphragm pump, or dual acting piston pumps. A typical example of such a unit is the Sono-Tek Versicoat™ ultra-sonic spraying system. The bed (5) is provided by a perforated conveyor belt (9) driven by a pair of rollers (11A, 11B) and is supported below the ultrasonic sprayer (3) and between the rollers (11A, 11B) by a vacuum table (13). This results in the bed (5) taking the form of a vacuum conveyor.

The membrane (2) is provided as an elongate web and is fed from a feed spool (15) onto the belt (9) at the roller (11A) and removed from the belt (9) at the roller (11B) where it is wound onto a loading spool (17). In this embodiment the membrane (2) is a Proton Exchange Membrane (PEM) for a Catalyst Coated Membrane (CCM) which forms part of a Membrane Electrode Assembly (MEA) of a hydrogen fuel cell. The membrane is hygroscopic in nature, meaning that water, either from the atmosphere or from water-based catalyst inks, is adsorbed upon contact. When adsorption takes place, the membrane swells and wrinkles and becomes dimensionally unstable. Upon subsequent drying, the wrinkling and swelling are reduced but not eliminated, leaving a permanently deformed and dimensionally compromised membrane. A membrane in this wrinkled state is not useable.

A electromagnetic radiation emitting device (21) is associated with the sprayer (3). In this embodiment the electromagnetic radiation emitting device (21) is an infrared heater which is secured to one side of the ultrasonic sprayer (3) between the belt (2) and sprayer (3). The infrared heater (21) is oriented to direct infrared radiation towards the spray (23) produced by the sprayer (3). A reflector (25) is secured facing the infrared heater (21) on the opposite side of the spray (23) to direct radiation which penetrates through the spray (23) back through the spray (23) towards the infrared heater (21).

A sensor (29), in this embodiment a non-destructive Bendtsen permeance gauge, is positioned above the bed (5) between the infrared heater (21) and roller (11B) and used to measure the in-plane permeability or roughness of the coating on the membrane (2). Measurements from the sensor (29) are fed into a controller (31), in this embodiment a programmable logic controller (PLC), which in turn controls the operation of the sprayer (3) and infrared heater (21).

In use, the membrane (2) is fed from the feed spool (15) over the belt (9) and onto the loading spool (17). The vacuum produced by the vacuum table (13) causes the membrane (2) to become firmly secured to the belt (9). This is important for consistent coating to be achieved. Operation of the sprayer (3) causes ink to be drawn from the reservoir (7) via a pulse-less ink delivery system such as dual-acting syringe pumps, a diaphragm pump, or dual-acting piston pumps and sprayed on the membrane (2) as it passes beneath the sprayer (3). The ink in this embodiment has a very low solids content typically under 10 percent by weight and resulting low viscosity typically under 20 centipoises in order to be capable of being sprayed through the ultrasonic sprayer (3). A relatively high volume of solvent has thus to be sprayed onto the membrane (2) in order to achieve the desired catalyst loading on the membrane (2). In normal circumstances this is less than ideal as it leads to an undesirable degree of swelling of the membrane due to its hygroscopic nature. However, operation of the infrared heater (21) results in heating of the spray (23) and evaporation of most of the solvent. The spray (23) consequently has a high solids content greater than 20 percent by weight and high viscosity greater than 100 centipoises by the time it is deposited on the membrane (2). This in turn results in minimal adsorption of solvent and swelling of the membrane (2).

The application of heat through radiation to cause evaporation of solvent such as water in the spray has a negligible effect on the spray pattern of the sprayer and no compensation is required to achieve a uniform catalyst loading on the membrane. The degree of evaporation can easily be controlled by adjusting the intensity of the infrared radiation without having to change any of the other operating conditions of the system. This also obviates the need to change droplet size by changing the sprayer or changing the distance to the membrane in an attempt to ameliorate the effects of a low viscosity coating fluid on the target surface.

In-plane permeability or roughness of the coating on the membrane (2) is measured by the sensor (29) and operation of the sprayer (3) and infrared heater (21) adjusted by the PLC (31) if necessary. For example, if the in-plane permeability of the coating is too low then the infrared heater (21) is controlled to produce a corresponding higher degree of radiation. Conversely, if the in-plane permeability of the coating is too high then the heat is decreased.

If required, heating can be provided in the vacuum table (13) to promote adhesion of the catalyst to the membrane (2).

Figure 2:
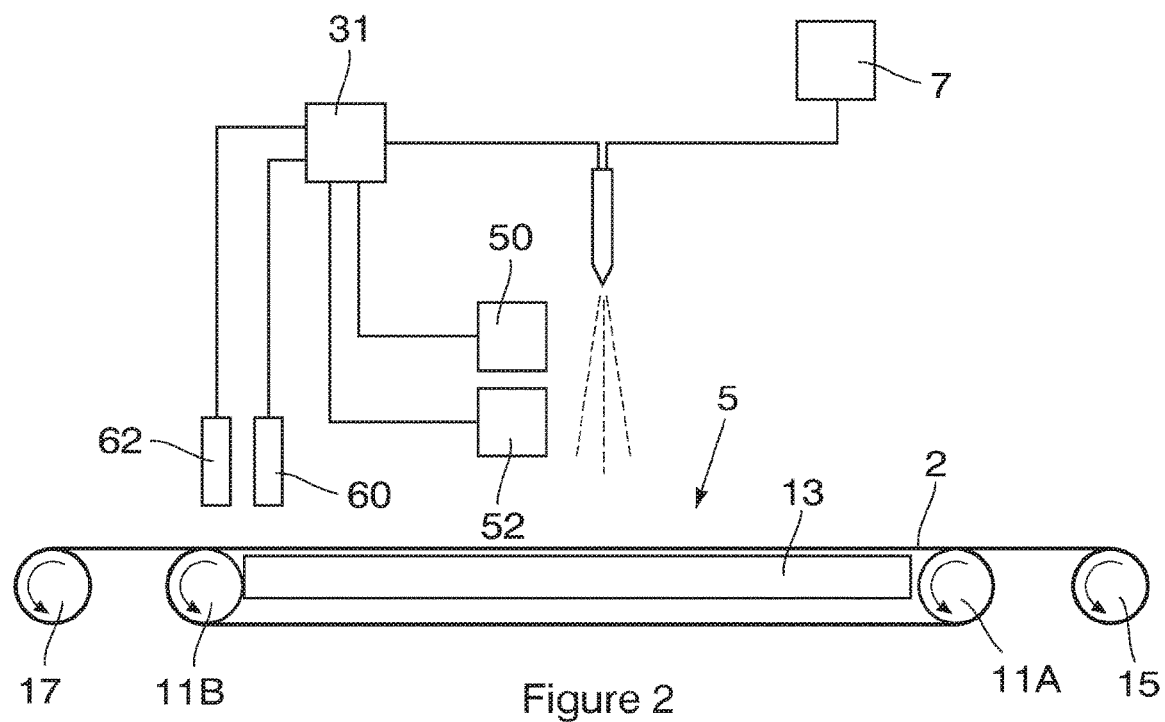

The coating system (1) is relatively straightforward to construct and operate yet is highly effective in modifying the physical characteristics of the spray produced by the sprayer. It will be appreciated that many other embodiments of a coating system exist which fall within the scope of the invention, particularly the sprayer and electromagnetic radiation emitting or spray modification device. For example, as shown in FIG. 2, in which like numerals indicate like features, more than one electromagnetic radiation emitting device (50, 52) can be associated with a sprayer (3), each to achieve a different or the same effect on the spray. Also, more than one sensor (60, 62) could be used to make measurements or to control the operation of the system.

The electromagnetic radiation emitting device could be configured or arranged to encircle the spray and any number of sprayer can be used. Any suitable target surface can be spray coated and the bed need not provide for movement of the target surface relative to the sprayer.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A coating system which includes a sprayer configured to spray a coating fluid onto a target surface and mounted spaced apart from a conveyor assembly bed on which the target surface is operatively located, characterised in that an electromagnetic radiation emitting device configured to produce a beam of electromagnetic radiation is located adjacent the sprayer and is directed towards spray produced by the sprayer so as to cause a degree of evaporation of solvent in the spray to increase the viscosity of the spray, and wherein the coating system further includes at least one reflector configured to focus the beam of electromagnetic radiation, wherein each of the at least one reflector is configured to direct the beam of electromagnetic radiation which penetrates the spray back through the spray towards the electromagnetic radiation emitting device.

2. The coating system as claimed in claim 1 in which the sprayer is an ultrasonic sprayer.

3. The coating system as claimed in claim 1 in which the electromagnetic radiation emitting device is a source of electromagnetic radiation selected from infrared, ultraviolet and microwave radiation.

4. The coating system as claimed in claim 1, wherein the beam of electromagnetic radiation is focused on the spray.

5. The coating system as claimed in claim 1, wherein the beam of electromagnetic radiation is shaped or sized to approximate a spray path defined by the spray.

6. The coating system as claimed in claim 1 which includes at least one sensor configured to measure air permeability and surface roughness of the coating on the target surface.

7. The coating system as claimed in claim 6 in which each of the at least one sensor is connected to a controller configured to control operation of either or both of the sprayer and the electromagnetic radiation emitting device in consequence of the measurements from each of the at least one sensor.

8. The coating system as claims in claim 1 which includes a plurality of electromagnetic radiation emitting devices associated with the sprayer, and wherein each of said plurality of electromagnetic radiation emitting devices is configured to modify a different characteristic of the spray.

9. The coating system of claimed in claim 8, wherein at least one of said electromagnetic radiation emitting devices is positioned to cause a reaction to take place in the spray.

10. The coating system as claimed in claim 1, wherein the electromagnetic radiation emitting device is configured at least partially to encircle the spray.

11. The coating system as claimed in claim 1, wherein the target surface is a surface of a Proton Exchange Membrane (PEM).

* * * * *